United States Patent [19]

Di Nunzio

[11] Patent Number: 4,544,909
[45] Date of Patent: Oct. 1, 1985

[54] FUEL CONSUMPTION SIGNALLING DEVICE FOR A MOTOR VEHICLE

[75] Inventor: Vittorio Di Nunzio, Turin, Italy

[73] Assignee: Fiat Auto S.p.A., Turin, Italy

[21] Appl. No.: 538,038

[22] Filed: Sep. 30, 1983

[30] Foreign Application Priority Data

Oct. 14, 1982 [IT] Italy ................... 68204 A/82

[51] Int. Cl.⁴ ............................................. B60Q 1/00
[52] U.S. Cl. ................................ 340/52 R; 73/114; 364/442
[58] Field of Search .............. 340/52 R; 364/442; 73/113, 114

[56] References Cited

U.S. PATENT DOCUMENTS

| | | | |
|---|---|---|---|
| 3,983,533 | 9/1976 | Goszyk et al. | 340/52 R |
| 4,384,479 | 5/1983 | Handtmann | 73/114 |
| 4,419,654 | 12/1983 | Funk | 340/52 R |
| 4,444,047 | 4/1984 | Kern | 364/442 X |
| 4,492,112 | 1/1985 | Igarashi et al. | 73/114 X |

FOREIGN PATENT DOCUMENTS

| | | | |
|---|---|---|---|
| 1243905 | 7/1967 | Fed. Rep. of Germany | 340/52 R |
| 2091358 | 7/1982 | United Kingdom | 364/442 |

*Primary Examiner*—James L. Rowland
*Assistant Examiner*—Thomas J. Mullen, Jr.
*Attorney, Agent, or Firm*—Seidel, Gonda, Goldhammer

[57] ABSTRACT

A signalling device for providing indications of the fuel consumption of an internal combustion engine of a motor vehicle comprises first and second sensor means which provide electrical signals indicative of the rate of rotation of the engine and the speed of the motor vehicle, respectively. The first sensor means are connected to a first processing circuit which provides an information signal proportional to the rate of rotation of the engine. A second processing circuit connected to the second sensor means provides a second information signal which is directly proportional to the speed of the vehicle when this speed is less than a predetermined value and which is zero when the speed is greater than the predetermined value. A first adding circuit is connected to the processing circuits and provides a sum signal corresponding to the sum of the first and second information signals. The amplitude of this first sum signal is indicative of the fuel consumption. Comparison circuit means compare the amplitude of the first sum signal with a plurality of ranges of predetermined values and provide the signalling means with control signals indicative of the range of values in which the instantaneous value of the amplitude of the first sum signal falls.

7 Claims, 8 Drawing Figures

FUEL CONSUMPTION SIGNALLING DEVICE FOR A MOTOR VEHICLE

DESCRIPTION

The present invention relates to a signalling device for a motor vehicle driven by an internal combustion engine, arranged to provide an indication of the fuel consumption.

In order to reduce the fuel consumption of a motor vehicle it has been proposed to provide signalling devices which, by displaying the instantaneous value of this consumption, for example, in liters of fuel consumed per predetermined distance travelled, such as 100 km, or by providing an indication of the range of consumption values ("low", "normal", "high") in which the instantaneous value of the consumption falls, provide the user with information usable to improve the driving in order to effect a fuel saving.

Various types of instruments and devices of this type exist which are arranged to provide indications which are useful to the user intending to make use of them.

Several very sophisticated devices make use of suitable programmed microprocessors connected to a plurality of sensors which provide electrical signals indicative of monitored physical parameters (low pressure in the induction manifold, fuel flow rate in the supply duct, etc.). These electrical signals are suitably processed by the microprocessor which provides visual display devices with signals indicative of the fuel consumption and other matters.

These known devices have the valued property of enabling the processing and visual display of the amplitudes of various values or parameters useful for the purpose of improving the driving, such as, for example the hourly fuel consumption, the specific fuel consumption (i 1/100 km, 1/km, etc.), or the quantity of fuel needed for a particular jouney at a predetermined speed.

On the other hand, these devices are very sophisticated and expensive, and moreover require the use of a considerable number of sensors.

The use of a microprocessor system, however, allows extremely precise indications to be obtained. Nevertheless such precision is wholly unjustified in the specific case of the indication of the fuel consumption.

In order to provide an indication of this consumption other much simple devices have been proposed, which make use of a pressure meter located in the induction manifold of the engine and controlling a pointer moveable along a scale or relative to a graphic reference. This type of instrument is very simple and relatively less expensive.

It provides an indication of increasing consumption the pressure in the induction manifold falls, until it indicates that the maximum consumption has been reached when the throttle valve is fully open. The indication provided by such an instrument is qualitatively correct only for a particular gear ratio and as long as only the accelerator pedal is operated. The indication provided to the user may be grossly erroneous when another gear ratio is selected. With this type of device, the increased economy involves a falling-off of the indication provided, sometimes to an unacceptable extent.

The object of the present invention is to provide a signalling device for indicating the fuel consumption of a motor vehicle, which requires the use of a limited number of sensors, particularly very cheap sensors, and very simple electronic curcuits, and which is thus less costly that those including microprocessors, while ensuring at the same time an acceptable degree of correctness of the indication provided to the user.

According to the invention, this object is achieved by means of signalling device the main characteristic of which lies in the fact that it comprises:

first sensor means for providing an electrical signal indicative of the rate of rotation of the engine of the motor vehicle;

second sensor means for providing an electrical signal indicative of the speed of the motor vehicle;

a first processing circuit connected to the first sensor means and arranged to provide a first information signal having an amplitude proportional to the rate of rotation of the engine;

a second processing curcuit connected to the second sensor means and arranged to provide a second information signal having an amplitude which is directly proportional to the speed of the vehicle when this speed is less than a predetermined value and a zero amplitude when the speed of the vehicle is greater than this predetermined value, the predetermined speed value being between the speed at which the fuel consumption is at a minimum under the slowest running conditions and the speed at which the fuel consumption is at a minimum under the fastest running conditions;

a first adding circuit connected to the first and second processing circuits for providing a first sum signal corresponding to the sum of the first and second information signals according to respective first predetermined weighting factors, the amplitude of the first sum signal being indicative of the fuel consumption;

first comparison circuit means arranged to compare the amplitude of the first sum signal with a plurality of predetermined ranges of values and to provide a control signal indicative of the range of values within which the instantaneous value of the amplitude of the first sum signal falls, and signalling means connected to the first comparison circuit means for providing perceptible signals indicative of the fuel comsumption upon receipt of control signals.

In use, the information provided by a fuel consumption signalling device may conveniently be supplemented by a further indication of the suitability of changing the gear ratio in order to reduce the fuel consumption.

According to a further characteristic, the device according to the invention allows this further indication to be provided without recourse to supplementary sensors simply by using the first and second information signals. This result is obtained by means of a device characterised in that it further includes:

a second adding circuit connected to the first and second processing circuits to provide a second sum signal corresponding to the sum of the first and second information signals according to respective second predetermined weighting factors, and second comparison circuit means arranged to compare the amplitude of the second sum signal with a plurality of predetermined ranges of values and to provide the further signalling means with activation signals indicative of the range of values within which the instantaneous value of the amplitude of the second sum signal falls.

Further characteristics and advantages of the device according to the invention will emerge from the detailed description which follows with reference to the appended drawings, provided purely by way of non-limiting examples, in which:

FIG. 6 shows the waveforms of two signals generated by the device illustrated in FIG. 5, FIG. 7 corresponds to the graph of FIG. 2 with the addition of curves with straight line portions defining threshold values for the number of revolutions at which it is convenient to change the gear ratio, and FIG. 8 is a block schematic diagram of a variant embodiment of the device of FIG. 5.

Several considerations constituting basic theories behind the invention will now be explained.

Figure 1:
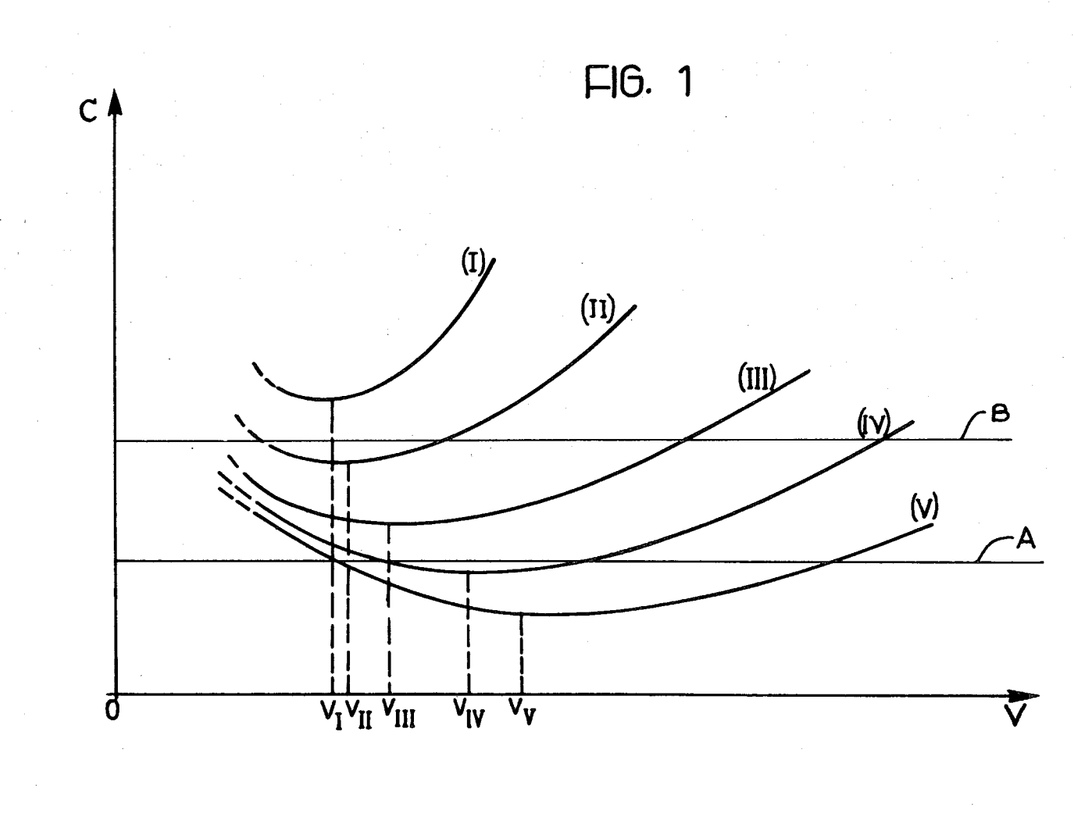
FIG. 1 is a graph showing the changes in the fuel consumption C in dependence on the speed V of a motor vehicle provided with a five-speed gear-box.

FIG. 1 is a cartesian diagram showing the variation in fuel consumption C for travelling a predetermined distance expressed, for example, in l/100 km, as a function of the speed v of the motor vehicle given on the abscissa. This graph shows fuel consumption curves for each gear ratio I–V for a motor vehicle having five distinct gear ratios. When the speed v increases, these fuel consumption curves display a first decreasing portion, then a minimum point and subsequently an increasing portion. The speed values at which the fuel consumption curves have their minimum values are indicated by $v_I$ to $v_V$.

Qualitatively, the curves of FIG. 1 are valid for any motor vehicle having an internal combustion engine and five distinct gear ratios.

Figure 2:
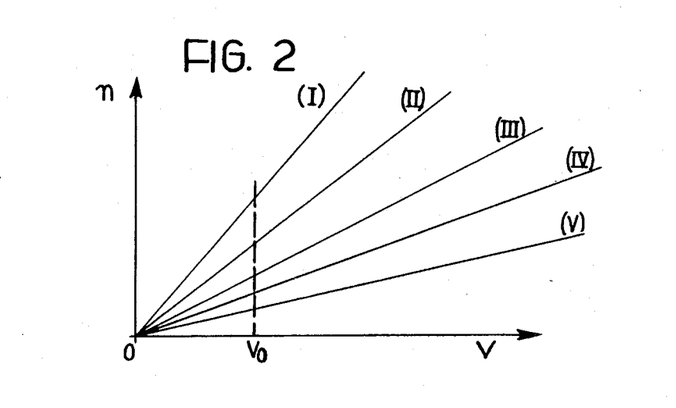
FIG. 2 is a graph showing the changes in the number of revolutions n of the engine in dependence on the speed v of a motor vehicle provided with five-speed gear-box.

In the graph of FIG. 2, the number of revolutions of the engine n are given on the ordinate while the speed of the vehicle v is given on the abscissa. In this graph, five straight lines are shown extending from the origin of the axes, which represent the functional relation between the number of revolutions of the engine and the speed of the motor vehicle for each gear ratio I–V.

The inventor has found that the fuel consumption curves shown in FIG. 1 may be approximated by means of curves composed of straight line portions in the manner which will now be described in detail with reference to FIG. 3. In this Figure the fuel consumption curves of FIG. 1 are shown on the same scale.

Starting from a speed $v_O$, the fuel consumption curves may be approximated by means of straight line portions extending from the origin. More particularly, the straight lines extending from the origin used for this approximation conveniently have angle coefficients which are in the same proportion to each other as that existing between the angle coefficients of the straight lines shown in FIG. 2. In other words, for $v > v_O$, the fuel consumption curves may be approximated by means of straight line portions obtained by drawing the straight lines of FIG. 2 in the graph of FIG. 3 with a simple change of scale factor on the axis of the ordinate.

This means that for $v > v_O$, the fuel consumption for each gear ratio may essentially be considered as directly proportional to the speed v of the vehicle and hence as directly proportional to the number of revolutions n, with a different factor $k_i$ for each gear ratio:

$$C = k_i \cdot n$$

Figure 3:
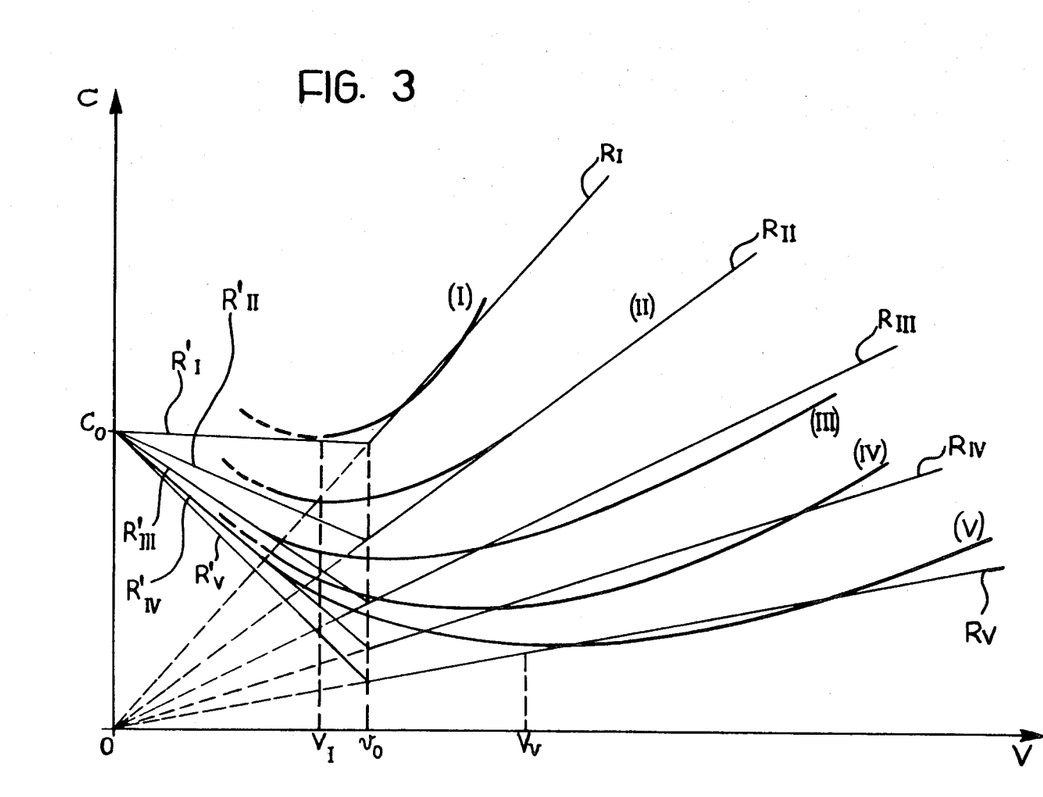
FIG. 3 is a graph showing the fuel consumption curves given in FIG. 1 and a curve composed of straight line portions approximating these fuel consumption curves.

As is seen from FIG. 3, the fuel consumption curves for $v > v_O$ may be approximated by means of straight line portions $R'_I$ to $R'_V$, extending from a single point on the ordinate axis, which corresponds to a fuel consumption value $C_O$.

Summarising what has been explained above, the curves which express the consumption C in dependence on the speed v may be approximated by means of segments comprising straight line portions originating from a single point on the ordinate axis with a negative slope, and by straight line portions extending from the origin of the axes, with angle coefficients which are in the same proportion to each other as the angle coefficients of the straight lines expressing the law between the number of revolutions n of the engine and the speed of the motor vehicle v.

In the following, the curve segments which approximate the real fuel consumption curves will for brevity be called the approximate fuel consumption curves.

The value of the speed $v_O$ for which the approximate fuel consumption curves have their minimum values is between the speeds $v_I$ and $v_V$, at which the fuel consumption is at minimum under the slowest running conditions (I) and the fastest running conditions (V).

Preferably, the value $v_O$ is chosen to be as close as possible to the value $v_I$.

Figure 4:
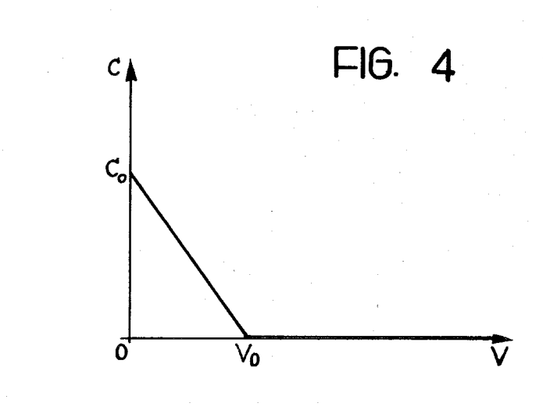
FIG. 4 is a graph illustrating an auxiliary function used, together with the curves of FIG. 2, to achieve the curves with straight line portions shown in FIG. 3.

With a simple examination of the approximate fuel consumption curves, it is immediately seen that these may be obtained by the superposition (that is, the sum) of a group of straight lines extending from the origin and having angle coefficients proportional to the angle coefficients of the straight lines of FIG. 2, and a function of the speed v having the course illustrated in FIG. 4. This function comprises a first linearly decreasing portion which in the plane C, v joins the coordinate [O, $C_O$] to the coordinate [$v_O$, O]. The said function also has a second portion coincident with the axis v for $v \geq v_O$.

On the basis of what has been explained above, it may be concluded that for the approximate fuel consumption curves in general the following expression is valid:

$$C = C_1(k_i, n) + C_2(v) \tag{2}$$

in which $C_1(k_i, n)$ represents the straight lines $R_I$ to $R_V$, and has the following expression:

$$C_1(k_i, n) = k_i \cdot n \tag{3}$$

and $C_2(v)$ represents the function illustrated in FIG. 4, and has the following expression:

$$C_2(v) = \begin{cases} C_o\left(1 - \dfrac{v}{v_o}\right) & \text{for } v \leq v_o \\ 0 & \text{for } v > v_o \end{cases} \tag{4}$$

In conclusion, from equations (3) and (4) the approximate fuel consumption curves are described by the following equations:

$$C = k_i \cdot n + C_o(1 - v/v_o) \text{ for } v \leq v_o \tag{5}$$

$$C = k_i \cdot n \text{ for } v > v_o \tag{6}$$

As is seen in particular from equation (2), the inventor has shown that a function indicative of the fuel consumption for each gear ratio may be obtained by adding two simple functions of the number of revolutions n and the speed of the vehicle v respectively.

In FIG. 1, the plane C, v has been divided into three regions by means of two straight lines A, B parallel to the axis v, to which respective fuel consumption values correspond. The points in this plane which are located beneath the straight line A represent operating conditions of the engine with low fuel consumptions. The points between the straight lines A, B represent running conditions with average or normal fuel consumption, while the points located above the straight line B represent running conditions with high fuel consumptions.

In the device according to the invention, based on the considerations above, as will become apparent from the following, a signal is generated of an amplitude proportional to the function C expressed by the equations (2) et seq. This signal is compared with the constant reference values (corresponding to the fuel consumption values associated with the straight lines A, B in FIG. 1) and on the basis of the result of this comparison signalling devices are actuated which provide an indication of the range of values in which the instantaneous fuel consumption value falls.

More particularly, the equations (5) and (6) immediately suggest the following operative procedure: for $v < v_O$ (a) the generation of an electrical signal of an amplitude proportional to n (and hence proportional to the function $C_1$);

(b) the generation of an electrical signal of amplitude proportional to $(1 - l_v)$ that is proportional to the function $C_2$, $(l = 1/v_o)$;

(c) the adding of these signals with respective weighting factors according to the equation (5), and (d) the comparison of the sum signal obtained with constant reference values and the consequent actuation of signalling means; and, for $v > v_O$:

(e) the generation of a signal of an amplitude proportional to n, according to the equation (6), and (f) the comparison of this signal with predetermined reference values, and the consequent actuation of signalling means.

Figure 5:
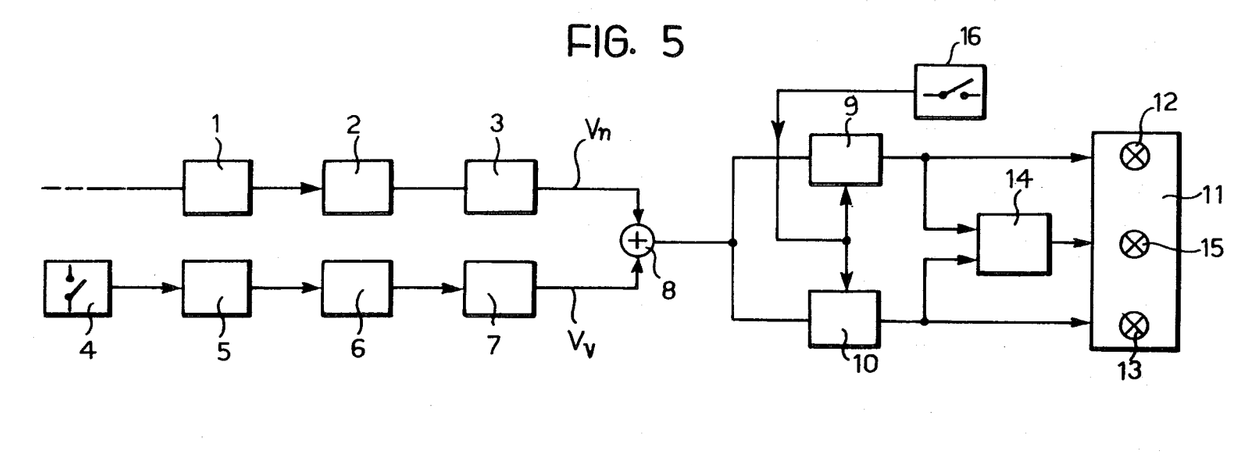
FIG. 5 is a block schematic diagram of a first embodiment of the device according to the invention.

FIG. 5 shows a first embodiment of the device according to the invention, which carries out the said operative procedure.

In this Figure a pulse-generating circuit is indicated 1, to the input of which is fed a pulsed signal taken, for example, from the ignition coil. The circuit 1 outputs pulses at a frequency proportional to the number of revolutions n of the engine. This signal is supplied to the input of a monostable circuit 2 the output of which is connected to an integrator circuit 3. The latter outputs a voltage signal $V_n$ the instantaneous amplitude of which is substantially proportional to the number of revolutions n of the engine.

A device, indicated 4, is arranged to provide an pulsed electrical signal with a period proportional to the speed v of the motor vehicle. In the case of motor vehicles having a tachometer device of the type including a rotary magnet, the device 4 may simply comprise a reed relay mounted close to the rotary magnet: on each revolution of the rotor this relay is actuated to open magnetically by the pole pieces of the rotor and hence to provide a fixed number of cut-outs per revolution of the rotor. As is known, the speed of rotation of this rotor is proportional to the speed of the motor vehicle. Hence the number of cut-outs per unit time achieved by means of this relay constitutes a measure of the speed of the motor vehicle.

The device 4 is connected to a pulse-generating circuit 5 and the output of the latter is connected to a monostable circuit indicated 6. The monostable circuit 6 is of the type characterised by an "off" period ($T_{off}$) which is constant, that is of the type which, in response to a control pulse, provides a low level logic signal of predetermined duration $T_{off}$. More particularly, if the signal fed to the input of the monostable circuit 6 has the waveform indicated $W_1$ in FIG. 6, the signal output by this monostable circuit assumes the waveform indicated $W_2$ in the same FIG. 6. It is noted particularly that, when the signal pulses $W_1$ occur at an interval of less than or equal to $T_{off}$, the output of the monostable circuit 6 is kept constantly at a low level.

The output of the monostable circuit 6 is connected to an integrator circuit 7.

It is immediately apparent that, if the period $T_{off}$ of the monostable circuit 6 is chosen so as to be equal to the time interval separating two pulses of the signal $W_1$ when the speed of the vehicle v is equal to $v_O$, the signal $V_v$ provided by the integrator circuit 7, upon a variation of the speed v, changes as shown by the function illustrated in FIG. 4.

In operation, the integrator circuit 3 outputs a signal proportional to the number of revolutions n of the engine, and hence proportional to the function $C_1$ in the equation (3) given above.

The integrator circuit 7 outputs a signal proportional to the function $C_2$ defined in the equation (4) given above.

The signals $V_n$ and $V_v$ are added in an adding circuit of conventional type, formed, for example, by means of an operational amplifier with respective weighting factors. The adding circuit 8 thus outputs a signal of an amplitude proportional to the function C defined in the equation (2). The amplitude of this signal is thus substantially proportional to the value of the fuel consumption for each speed v and number of revolutions n according to the approximation described above.

The signal provided by the adding circuit 8 is fed to two threshold comparator circuits 9, 10 preferably of the hysteresis type. The threshold comparator 9 may, for example, be of the non-inverting type for comparing the signal provided by the adding circuit 8 with a reference value corresponding to the fuel consumption associated with the straight line B of FIG. 1. The comparator 10, of inverting type, compares the signal provided by the adder 8 with a reference signal corresponding to the fuel consumption associated with the straight line A of FIG. 1.

The comparator circuits have their outputs connected to a visual display device, generally indicated 11.

This visual display device comprises first and second lamps 12, 13 actuated in known manner by means of the signal output by the comparator circuits 9, 10. More particularly, the lamp 13, which may, for example, be green, is lit in operation when the fuel consumption is less than the value associated with the straight line A of FIG. 1, that is, when the consumption is "low". The lamp 12, for example, red, is lit in operation, when the fuel consumption exceeds the value associated with the straight line B in FIG. 1, that is, when the fuel consumption is "high".

The outputs of the comparator circuits 9, 10 are conveniently connected to a further comparison circuit 14, the output of which controls a further lamp 15 of the signalling device 11. The circuit 14 may be constituted, for example, by a NOR logic circuit, which outputs a signal at the "high" level when the outputs of both the comparator circuits 9, 10 are at the "low" level, that is when the fuel consumption is between the values associated with the straight lines A, B of FIG. 1. The lamp 15, for example, yellow, is therefore intended to light when the fuel consumption falls within the "normal" range.

Alternatively, the comparison circuit 14 may be constituted by a further threshold comparator circuit.

In order to avoid signalling "high" fuel consumptions when the vehicle is stopped and the engine is at its minimum running speed, the device according to the invention may be equipped with a further sensor 16 arranged to output a signal when the throttle valve of the carburetor of the engine is closed. This sensor device may simply comprise a switch and is connected to the inputs for preventing the operation of the comparator circuits 9, 10.

The device according to the invention, illustrated in FIG. 5, has numerous advantages.

In the first place, it allows the provision of an indication of the fuel consumption by means of the monitoring of only two parameters: the number of revolutions and the speed of the motor vehicle. It is not therefore necessary to use sophisticated and expensive sensors such as fuel flow rate meters, etc.

The signals indicative of the said two parameters are also processed by means of very simple and hence low-cost circuits.

The device according to the invention may also be applied to any motor vehicle provided with an internal combustion engine having a gear-box with any number of distinct ratios. Indeed the approximations illustrated above for the real fuel consumption curves have, from a qualitative point of view, general validity.

Naturally, more than two threshold fuel consumption values may be provided, by means of the use of further comparator circuits and further lamps or similar optical signalling devices.

Moreover, by means of the addition of a small number of circuit components, the device according to the invention may be further developed, so as also to be able to provide an indication as to the manner of driving to be adopted to reduce the fuel consumption, particularly in relation to suitability of changing to a higher or lower gear.

Figures 6, 7, 8:
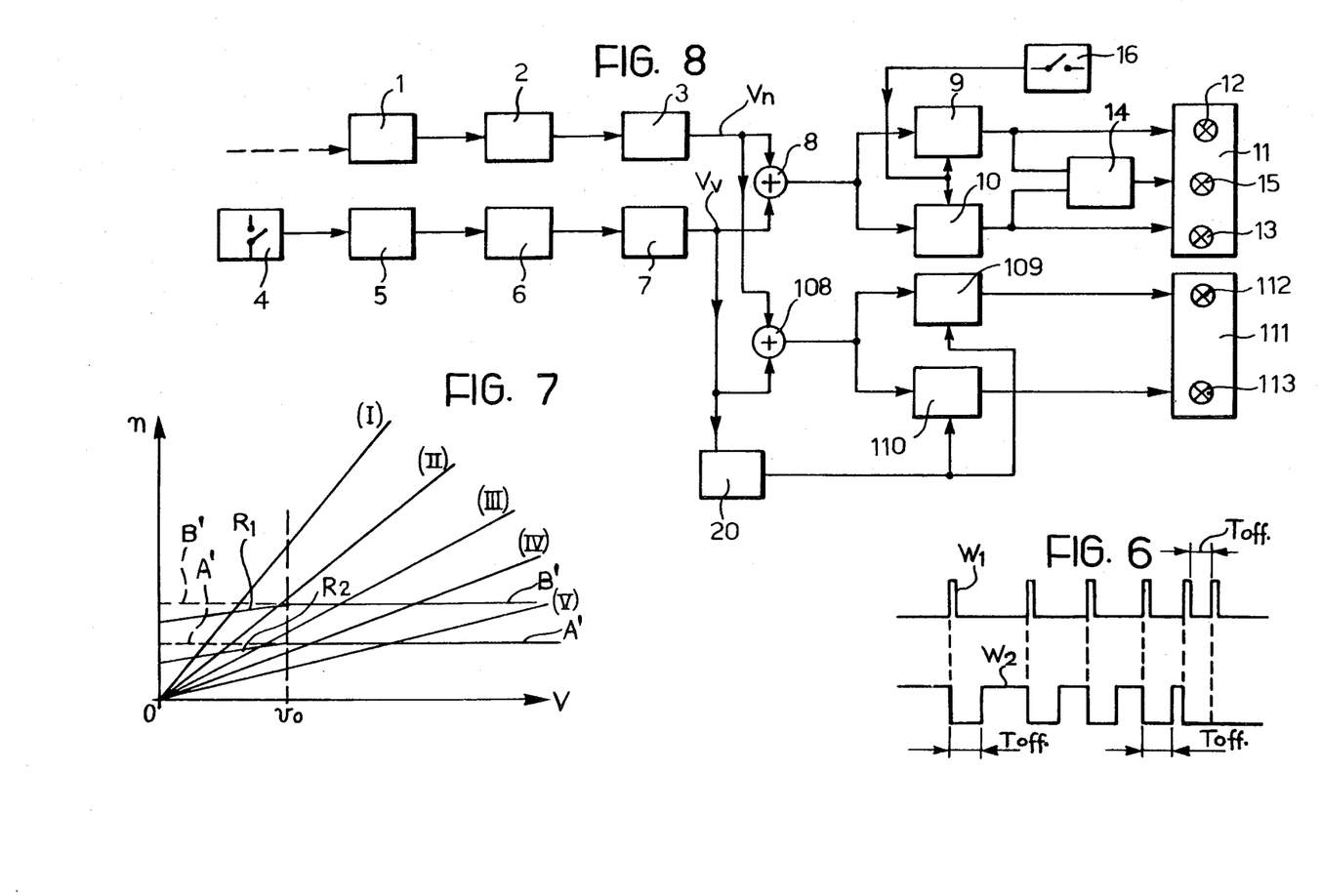

Before passing on to the detailed description of an embodiment of the device which allows such further signals, further theoretical considerations are put forward with reference to FIG. 7.

FIG. 7 is a graph of FIG. 2 with the addition of two straight lines A', B' which are parallel to the abscissa and each of which is associated with a particular number of revolutions n of the engine.

The straight lines A', B' divide the plane n, v into three regions. The points located beneath the straight line A' correspond to operating conditions in which it would be appropriate to change to a lower gear, while the points located above the straight line B' represent operating conditions in which it would be more appropriate to change to a higher gear.

The points in the range between the straight lines A', B' represent operating conditions in which the gear engaged is the most appropriate.

In order to provide an indication of the suitability of changing gear it would in fact suffice to generate a signal proportional to the number of revolutions n and to compare this signal with two predetermined reference values corresponding to the straight lines A', B'.

However, it has been found that, particularly for lower gears which have a well known correspondence to higher fuel consumptions, it may be convenient in order to reduce the fuel consumption by "anticipating" the engagement of a higher gear during acceleration, and by delaying a change to the lower gear during decelerations. This "anticipation" and "delay" of gear changes at low speed can easily be achieved by comparing, at the lower speed, a signal proportional to the number of revolutions n with a reference which falls, for example, linearly, upon a reduction in the speed v. This may be achieved, for speeds less than a value $v_O$, by comparing the number of revolutions n with two linearly increasing references with the speed v, as indicated by tne straight line portions $R_1$, $R_2$ of FIG. 7.

The choice of the value $v_O$ as the abscissa for the connecting points between the segments $R_1$, $R_2$ and the straight lines A', B' does not in itself constitute a compulsory choice but is particularly advantageous in order to achieve the device which will be described below.

Once adopted, in order to indicate the suitability of a gear change, the criterion for the comparison of the number of revolutions n with the constant reference values for $v > v_O$, and with the linearly decreasing reference value upon a decrease in the speed v, as indicated by the portions $R_1$, $R_2$ may be carried out according to the following considerations.

For $v < v_O$ the limited situation between the conditions in which it is appropriate to change gear and the conditions in which it is more appropriate to retain the engaged gear is shown analytically by checking a condition of the type:

$$n = c \cdot (v + n_o/c) \tag{7}$$

in which c is a constant and $n_O$ represents the number of revolutions in correspondence with which the variable reference depending upon the speed (and hence the portion $R_1$ or the portion $R_2$) intersects the ordinate axis.

These conditions are equivalent to the following:

$$n - cv + \alpha = \beta \tag{8}$$

in which $\beta - \alpha = n_o$ with $\alpha$, $\beta$ both constants.

This equation may also be put in the following form:

$$n + \alpha(1 - c/\alpha \cdot V) = \beta = \text{constant} \tag{9}$$

The equation (9) immediately suggests the following criterion for determining the limited situation between a condition of operation in which it is appropriate not to change the gear ratio previously engaged and a condition in which it is more appropriate to change this ratio. This operative criterion may be summarised as follows:

(a') generation of a first electrical signal of an amplitude proportional to the number of revolutions n, (b') generation of a second electrical signal of an amplitude proportional to $(1-\lambda'v)$, in which $\lambda'=c/\alpha$, (c') adding the said signals with respective weighting factors according to the equation (9), (d') comparison of the sum signal obtained with a constant reference signal.

When the speed v is greater than the value $v_O$, however, the limited situation occurs when n assumes predetermined constant values associated with the straight lines A', B' of FIG. 7.

From an operative point of view, in order to identify the occurrence of this situation it suffices:

(e') to generate a signal of an amplitude proportional to n, and (f') to compare the signal with predetermined reference values.

If one compares the operations (a') ... (f') given by the equation (9) with the corresponding operations (a) ... (f) given by the equations (5) and (6) above, it may be noted that, from a strictly operative point of view, they are exactly the same, the sole difference lying in the different weighting factors with which the electrical signal proportional to the number of revolutions and the electrical signal which is a linear decreasing function of the speed v are summed, and in the different reference values used in the comparison stages.

Consequently, in order to signal whether or not it is appropriate to change gear, the same signals $V_n$ and $V_v$ generated in the device of FIG. 5 may conveniently be used as the signal proportional to n and the signal which is a linear function of v.

FIG. 8 shows a variant embodiment of the device illustrated in FIG. 5, in which the result of the deductions just considered are carried out in practice.

In FIG. 8, the components already described above with reference to FIG. 5 have again been given the same reference numerals as used in that Figure.

With respect to the version illustrated in FIG. 5, the device of FIG. 8 further includes an additional adding circuit 108 connected to the output of the integrator circuits 3, 7. The adding circuit 108 adds together the signals $V_n$ and the signal $V_v$ according to the coefficients provided in equation (9). The summed signal output by the adding circuit 108 is fed to first and second threshold comparator circuits 109, 110 which compare the summed signal with respective constant predetermined reference values. More particularly, the threshold comparator circuit 109 compares the summed signal with a constant reference value greater than the constant reference value associated with the threshold comparator 110. Moreover, the comparator 109 is conveniently of the non-inverting type while the comparator 110 is of the inverting type.

These comparator circuits control a signalling device, generally indicated 111, and including two lamps or similar devices 112, 113. The lamp 112 is lit to indicate the suitability of changing to a higher gear ratio, when the summed signal provided by the adding circuit 108 exceeds the reference associated with the comparator circuit 109. When this summed signal falls below the reference value associated with the comparator circuit 110, however, the latter activates the lamp 113 which provides a clear indication of the suitability of changing to a lower gear ratio.

Thus, the device illustrated in FIG. 8 allows not only the provision of an indication relative to the range of values in which the instantaneous fuel consumption lies, but also an indication of the suitability of changing the engaged gear ratio or not.

As we put forward above and as described below, this is achieved by the addition of a very limited number of components to the device illustrated in FIG. 5, and by making use of a simple processing of the generated signals $V_n$ and $V_v$ in order to allow the indication of the fuel consumption itself.

As stated above, the comparison of the number of revolutions of the engine with a reference value which is linearly variable in dependence on the speed, for speeds less than $v_o$, allows the "anticipation" of an indication of the suitability of changing to a higher ratio when the ratio engaged is a low ratio. In the situation illustrated in the graph of FIG. 7, it is possible to anticipate this indication for the ratios I and II. However, this could result in the inconvenience that, on starting with the first gear (I) engaged, the device according to the invention immediately provides an indication about the suitability of changing immediately to a higher gear. In order to avoid this disadvantage, it is preferable to prevent the operation of the comparator circuits 109, 110 when the speed v of the motor vehicle is less than a predetermined minimum value. For this purpose, a further comparator circuit, indicated 20 in FIG. 8, may be provided with its input connected to the output of the integrator circuit 7 and its output connected to inhibiting inputs of the comparator circuits 109, 110. The comparator circuit 20 may be arranged, in known manner, to provide an inhibiting signal to the comparator circuits 109, 110 when the speed of the motor vehicle is less than a predetermined value.

The device illustrated in FIG. 8 has considerable structural simplicity and may easily be formed with simple low-cost circuits.

Naturally, the principle of the invention remaining the same, the embodiments and the constructional details may be varied widely with respect to those described and illustrated purely by way of non-limiting example, without thereby departing from the scope of the present invention.

What is claimed is:

1. A signalling device for providing indications of the fuel consumption of an internal combustion engine of a motor vehicle, comprising:

first sensor means for providing an electrical signal indicative of the rate of rotation of the vehicle engine;

second sensor means for providing an electrical signal indicative of the speed of the vehicle;

a first processing circuit connected to said first sensor means and arranged to provide a first information signal having an amplitude proportional to the rate of rotation of the engine;

a second processing circuit connected to said second sensor means and arranged to provide a second information signal having an amplitude which is directly proportional to the speed of the vehicle when this speed is less than a predetermined value and a zero amplitude when the speed of the vehicle is greater than this predetermined value, said predetermined speed value being between the speed at which the fuel consumption is at a minimum under the slowest running conditions of the engine and the speed at which the fuel consumption is at a minimum under the fastest running conditions;

a first adding circuit connected to said first and second processing circuits for providing a first sum signal corresponding to the sum of said first and second information signals according to respective first predetermined weighting factors, the amplitude of the first sum signal being indicative of the fuel consumption;

first comparison circuit means arranged to compare the amplitude of said first sum signal with a plurality of predetermined ranges of values and to provide control signals indicative of the range of values within which the instantaneous value of the amplitude of said first sum signal falls, and signalling means connected to said first comparison circuit means for providing perceptible signals indicative of the fuel consumption upon receipt of said control signals.

2. A device as defined in claim 1, for a motor vehicle having a gear-box with distinct gear ratios, and also including further signalling means arranged to provide perceptible signals of an opportunity of changing the gear ratio to reduce the fuel consumption upon receipt of an activation signal, wherein said device further includes;

a second summing circuit connected to said first and second processing circuits to provide a second sum signal corresponding to the sum of the said first and second information signals according to respective second predetermined weighting factors, and a second comparison circuit means arranged to compare the amplitude of said second sum signal with respective predetermined values, and to provide said further signalling means with activation signals indicative of the range of values within which the instantaneous value of the amplitude of said second sum signal falls.

3. A device as defined in claim 1, in which said second sensor means are arranged to provide a pulsed electrical signal having a period proportional to the speed of the vehicle, wherein said second processing circuit includes a monostable circuit connected to said second sensor means and arranged to output a "low" level signal for a predetermined period of time each time it receives a pulse from said sensor means.

4. A device according to claim 1, wherein said predetermined value of the speed of the motor vehicle is as close as possible to the speed at which the fuel consumption is at a minimum for the slowest running conditions.

5. A device as defined in any one of the preceding claims, wherein said first comparison circuit means include first and second threshold comparator circuits and a further comparison circuit arranged to provide a control signal only when the outputs from the first and second threshold comparator circuits are simultaneously at the same logic level.

6. A device as defined in claim 5, wherein said further comparison circuit comprises a NOR circuit.

7. A device as defined in claim 5, wherein said further comparison circuit includes a third threshold comparator circuit.

* * * * *